W. H. BARNES.
POULTRY RUN.
APPLICATION FILED JUNE 9, 1914.
1,185,578.
Patented May 30, 1916.
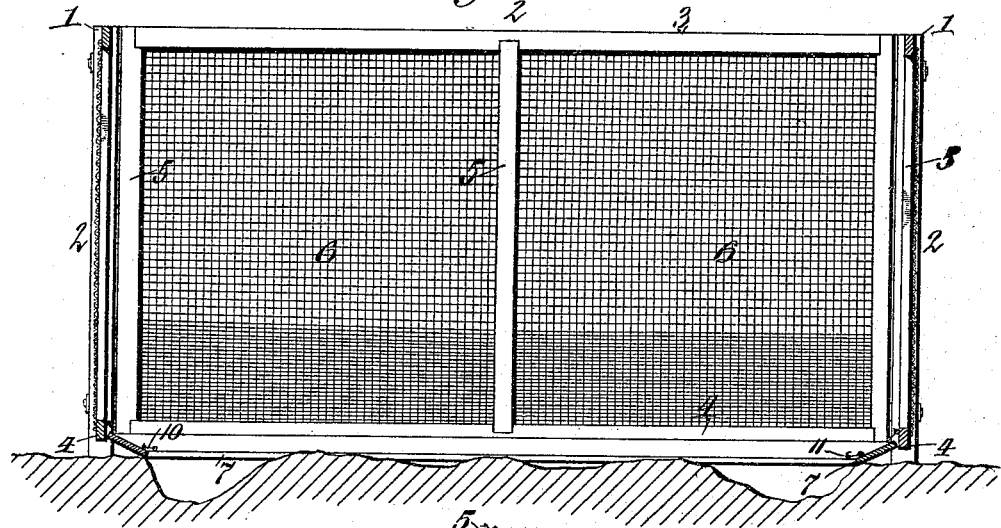
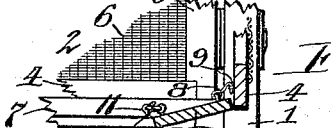
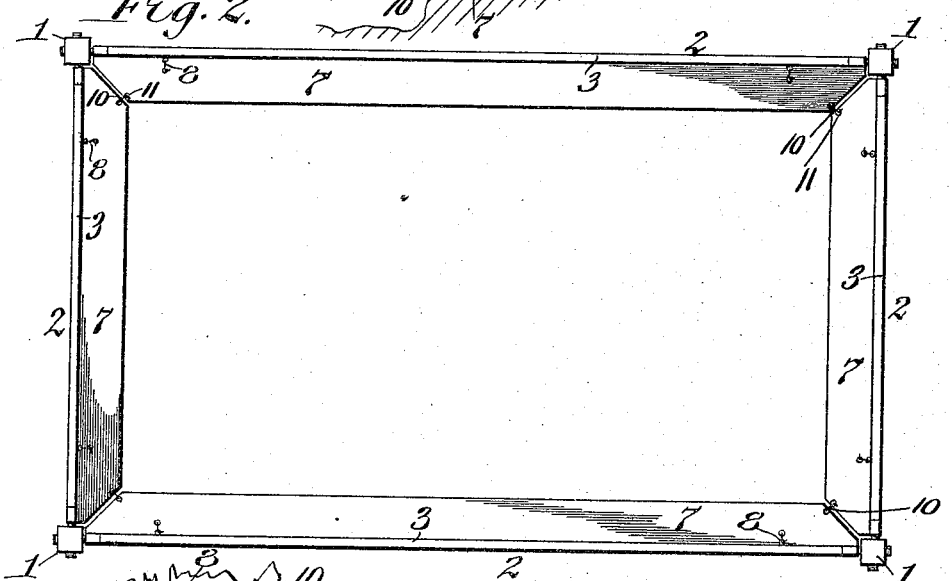
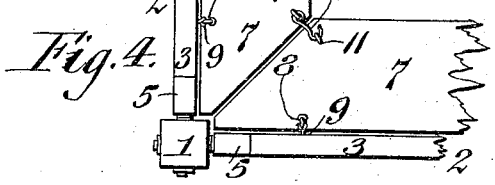
Inventor
Walter H. Barnes
by Geyer & Topp
Attorneys.

UNITED STATES PATENT OFFICE.

WALTER H. BARNES, OF BUFFALO, NEW YORK.

POULTRY-RUN.

1,185,578.   Specification of Letters Patent.   Patented May 30, 1916.

Application filed June 9, 1914. Serial No. 843,996.

*To all whom it may concern:*

Be it known that I, WALTER H. BARNES, a citizen of the United States, residing at Buffalo, in the county of Erie and State of New York, have invented new and useful Improvements in Poultry-Runs, of which the following is a specification.

This invention relates to a poultry run or inclosure whereby chickens or the like may be confined within a certain area of ground and more particularly to a portable poultry run of this character which may be readily and conveniently transported from place to place.

It is the object of this invention to produce a poultry run in which the poultry is prevented from scratching holes in the ground under the lower edges of the walls and escaping therefrom.

In the accompanying drawings: Figure 1 is a vertical section of a poultry run embodying my improvements. Fig. 2 is a top plan view of the same. Fig. 3 is a fragmentary vertical section on an enlarged scale, of the lower part of the poultry run. Fig. 4 is a fragmentary top plan view, on an enlarged scale, of one corner of the poultry run.

Similar characters of reference indicate corresponding parts throughout the several views.

In its general organization the poultry run comprises a plurality of upright corner posts 1 and a plurality of upright walls or fence panels 2 which are detachably connected at their vertical edges with said posts. Each of these posts is adapted to rest with its lower end on the ground and is preferably constructed of wood so that it is of rectangular form in horizontal section and presents four vertical sides. Each of the walls comprises upper and lower horizontal bars, 3, 4 and upright bars 5 which are also preferably constructed of wood. The openings formed by the spaces inclosed by the several upright and horizontal bars of each wall may be covered in any suitable manner but preferably by a panel 6 of woven wire of comparatively coarse mesh which is secured to the inner side of the bars of each wall.

It is well known that chickens and other poultry are inclined to scratch the ground within the run next to the lower edges of the side walls and, in the absence of any provision to prevent it, this soon forms an opening in the ground underneath the walls through which the poultry can escape to the exterior of the run. To prevent this, guard boards 7 of any suitable construction are placed in a substantially flat position over the ground along the lower edges of the walls. These boards prevent the chickens from scratching the ground immediately adjacent to the walls and any scratching of the ground which may be done adjacent to the inner edges of these guard boards will not form a hole through which the chickens can escape under the walls. These boards preferably rest at their inner edges on the ground and are detachably suspended at their outer edges at a distance above the ground on the inner sides of the adjacent lower horizontal bars of the walls. The preferred means for this purpose which are shown in the drawings comprise hooks 8 secured to the outer portions of guard boards and detachably engaging eyes or loops 9 arranged on the inner sides of the lower wall bars. The opposing ends of two adjacent guard boards which are arranged at right angles to each other are preferably cut off on a miter or bevel so that they can come close together, as shown in Figs. 2 and 3, and these ends of adjacent guard boards are preferably detachably connected by means of a hook 10 arranged on one of these boards and engaging with an eye 11 on another adjacent board. By this means these boards may be conveniently detached from each other and from the walls when desired for storage or transportation and when the same are installed in the completed poultry run the latter may be easily dragged over the ground from one place to another for giving the poultry a fresh scratching surface without liability of disarranging any of the parts of the poultry run which rest upon the ground.

I claim as my invention:

A poultry run comprising a permanently upright wall, and a guard board normally arranged horizontally along the inner side of said wall and having its outer edge arranged adjacent to the lower part of said wall while its inner edge rests on the ground, and means for detachably connecting said board with said wall comprising eyes arranged on said wall, and hooks arranged on said board and engaging with said eyes.

Witness my hand this 28th day of May, 1914.

WALTER H. BARNES.

Witnesses:
FRANK R. JEWETT,
ORVILLE A. KIRBY.

Copies of this patent may be obtained for five cents each, by addressing the "Commissioner of Patents, Washington, D. C."